US005499575A

United States Patent [19]

Handel et al.

[11] Patent Number: 5,499,575
[45] Date of Patent: Mar. 19, 1996

[54] FOOD LOAF SHAPING AND TEXTURIZING RACK

[75] Inventors: Gary A. Handel, Austin, Minn.; John A. Jonovic, Fitchburg; Otto L. Krueger, Madison, both of Wis.

[73] Assignee: Oscar Mayer Foods Corporation, Madison, Wis.

[21] Appl. No.: 249,563

[22] Filed: May 26, 1994

[51] Int. Cl.[6] .................... A22C 7/00; A23P 1/00
[52] U.S. Cl. .................. 99/349; 99/353; 99/441; 99/450.1; 249/82; 249/121; 425/190; 425/376.1; 452/30
[58] Field of Search ............... 99/441, 351, 349, 99/450.1, 353, 355, 517, 532, 427; 249/82, 121, 120, 126; 452/30, 46; 426/407, 524, 513, 512, 516, 811; 425/302.1, 372, 376.1, 470, 190

[56] References Cited

U.S. PATENT DOCUMENTS

| | | | |
|---|---|---|---|
| 3,580,165 | 5/1971 | Foldenauer | 99/351 |
| 3,646,881 | 3/1972 | Rathjen et al. | 99/351 |
| 3,838,963 | 10/1974 | Good | 249/121 |
| 3,999,736 | 12/1976 | Theodorsen | 249/91 |
| 4,009,858 | 3/1977 | Borsuk et al. | 249/120 |
| 4,081,564 | 3/1978 | Borsuk | 426/513 |
| 4,731,006 | 3/1988 | Freda et al. | 425/376.1 |
| 4,891,237 | 1/1990 | Rabotski | 99/441 |
| 4,960,211 | 10/1990 | Bailey | 99/441 |

*Primary Examiner*—Timothy F. Simone
*Attorney, Agent, or Firm*—Lockwood, Alex, Fitzgibbon & Cummings

[57] ABSTRACT

A food loaf shaping and texturizing rack is provided which transforms a generally cylindrical large food loaf, stick or chub into a shape which approximates that of a natural food product, such as whole muscle meat when sliced. The rack also includes a lattice network which forms irregularities in the surface of the finished product.

19 Claims, 6 Drawing Sheets

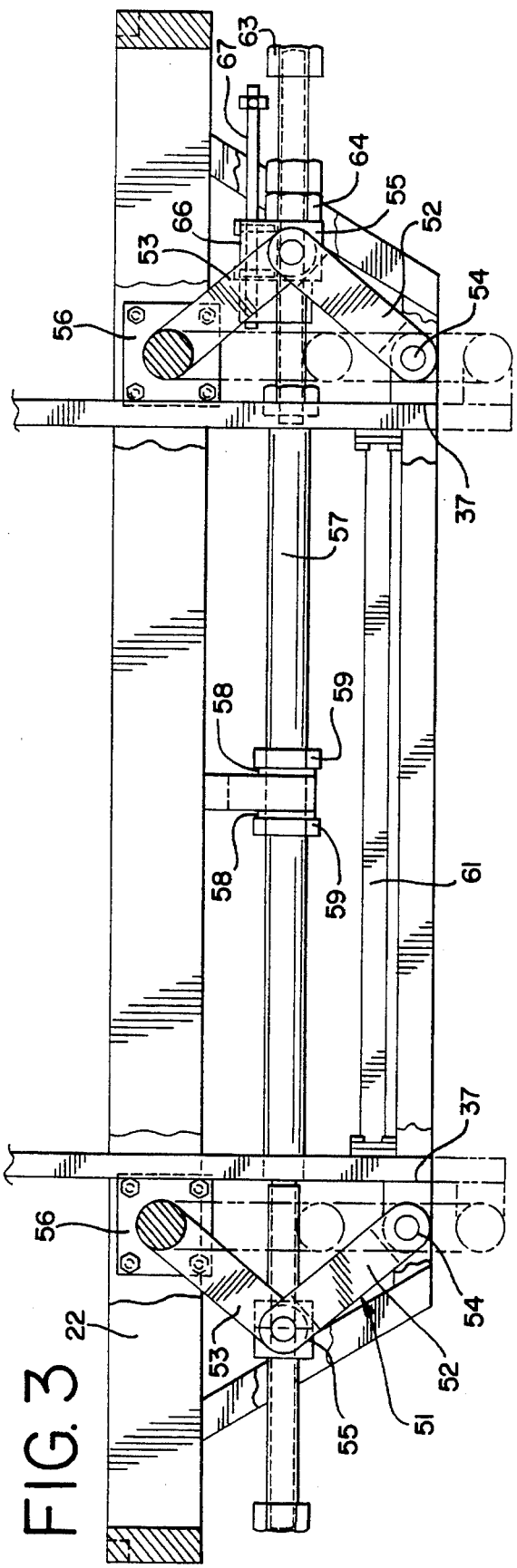
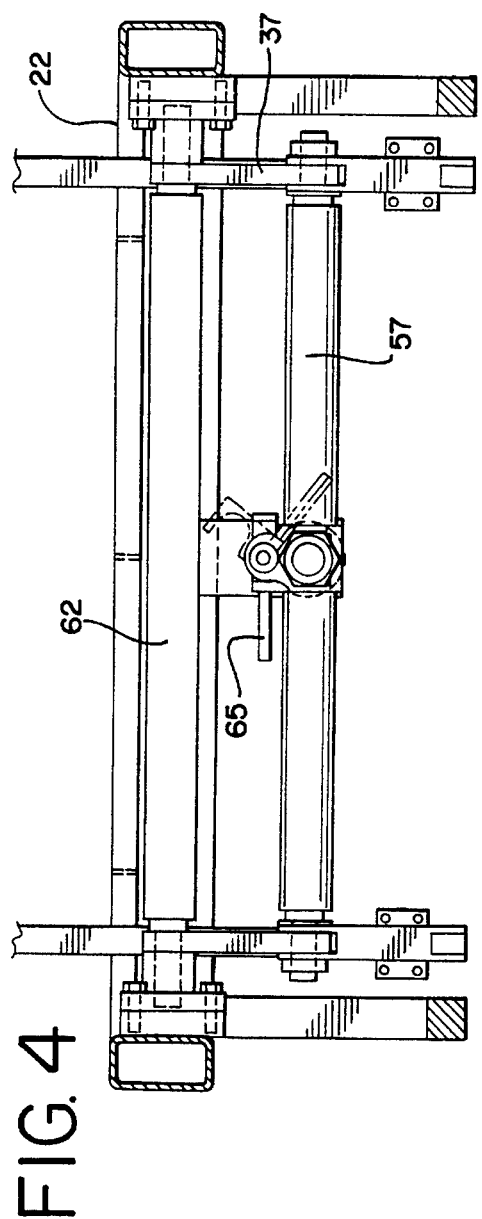

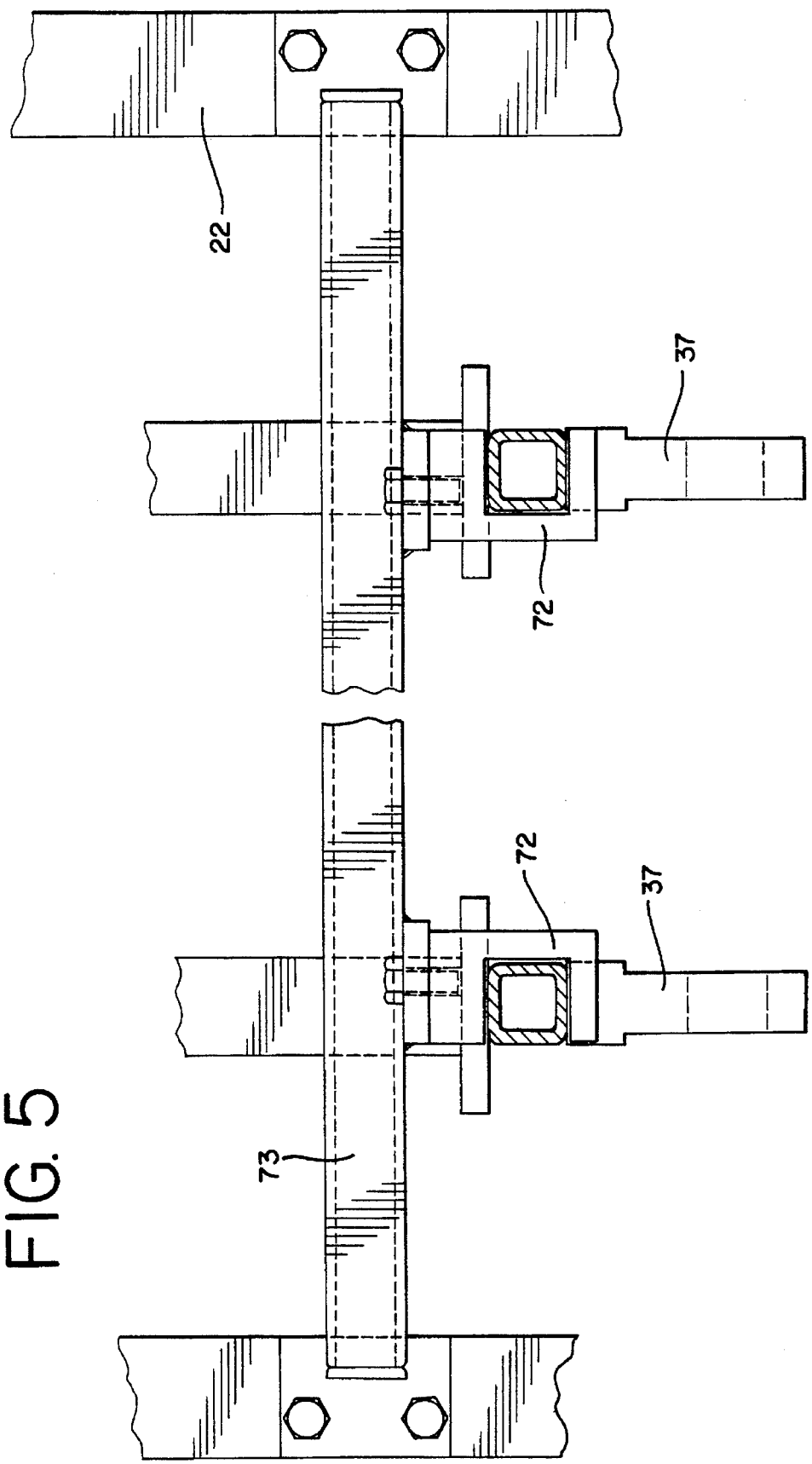

FOOD LOAF SHAPING AND TEXTURIZING RACK

BACKGROUND AND DESCRIPTION OF THE INVENTION

The present invention generally relates to manufacturing of loaf, stick, chub or sausage products on a high-volume commercial scale and more particularly to racking equipment that not only shapes food cylinders into a desired cross-sectional configuration, but also simultaneously texturizes the surface of the food product in order to impart same with surface irregularities that provide product slices which emulate the appearance and texture of naturally occurring food product slices. The racking arrangement includes elongated top and bottom plate pairs which move with respect to each other between a selected initial height for receiving a food cylinder and a chosen compression height at which the food cylinder is imparted with the desired shape and surface texture.

The making of large elongated loaves or sticks of meat or other food products into a form that is suitable for slicing on an industrial or commercial scale has long been practiced. In this regard, a meat emulsion or grind is typically stuffed within a casing or other compartment to hold same together during cooking, smoking and/or packaging operations. In the usual situation, the finished product has an appearance which is characteristic of a luncheon meat. Such an appearance limits the salability of the food product. Even when sliced, it has the characteristic lunchmeat appearance, shape and outside texture.

In accordance with the present invention, these loaf-types of product are formed which have less of the appearance of luncheon meat and more of the appearance of a slice from a whole muscle portion of an animal carcass. Instrumental in this regard is a racking apparatus that simultaneously shapes an initially cylindrical loaf into a loaf having an irregularly shaped cross-section while at the same time forming a texturized surface of the formed loaf. The apparatus includes a frame assembly having one or more elongated compartments containing an elongated bottom plate and an elongated top plate. Relative plate movement effects a compression of a food loaf positioned therebetween. At least one of these elongated plates has a plurality of indents that define an inside surface which takes on a general lattice surface configuration. The lattice surface configuration clamps down onto the meat surface during relative closing movement of the elongated plates, with the result that projecting portions of the elongated plate enter the surface of the meat, while recessed and/or open portions of the latticed surface accommodate the meat as it is compressed by operation of the rack apparatus. This imparts surface texture and irregular shaping. The surface texture and irregular shape are permanently molded into the loaf product when the rack apparatus is moved into cooking and/or smoking rooms or environments.

It is a general object of the present invention to provide improved racking of loaves, sticks or large chubs of meat and the like.

Another object of the present invention is to provide an improved racking apparatus for forming cylinders of meat and the like into food loaves having a shape which, when sliced substantially transversely emulates natural-looking food product slices.

Another object of the present invention is to provide an improved food loaf shaping and texturizing rack which subjects an initially cylindrical loaf to compression conditions in order to impart both an irregular cross-sectional shape and a surface texture to the loaf.

Another object of this invention is to provide improved racking that accomplishes large-scale food production from readily available food sources rather than requiring whole muscle sources.

These and other objects, features and advantages of the present invention will be clearly understood through a consideration of the following detailed description.

BRIEF DESCRIPTION OF THE DRAWINGS

The invention will be further elucidated in the following description with reference to the accompanying drawings in which:

FIG. 3 is a detailed elevational view, partially broken away, of the drive assembly of this embodiment;

FIG. 4 is an end elevational view, partially broken away, of the drive assembly illustrated in FIG. 3;

FIG. 5 is a detailed view, partially broken away, of the slide bearing assembly and pusher assembly illustrated in the preferred embodiment;

DESCRIPTION OF THE PARTICULAR EMBODIMENTS

Figure 1:
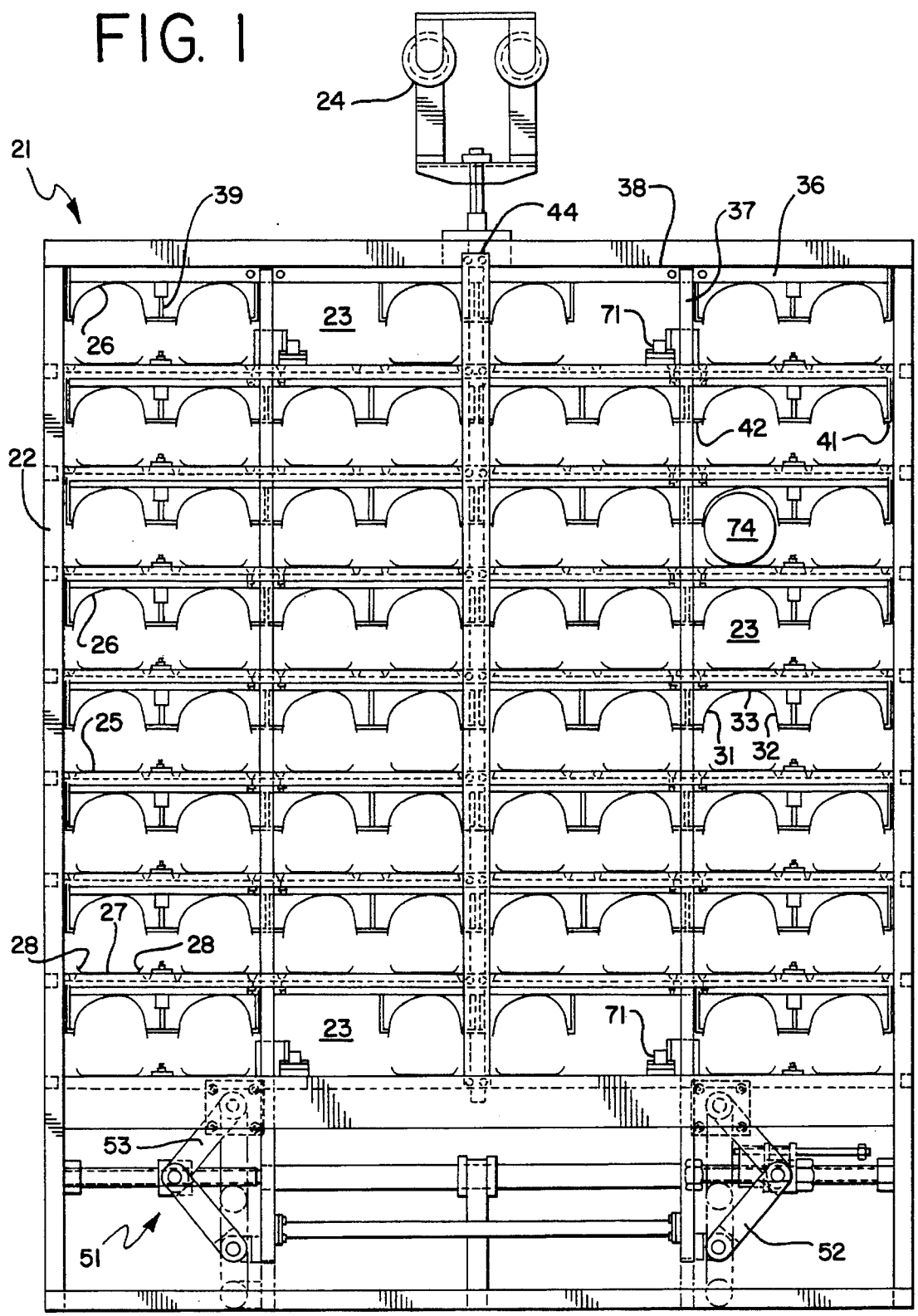
FIG. 1 is a side elevational view of a preferred racking apparatus in accordance with the present invention.
Figure 2:
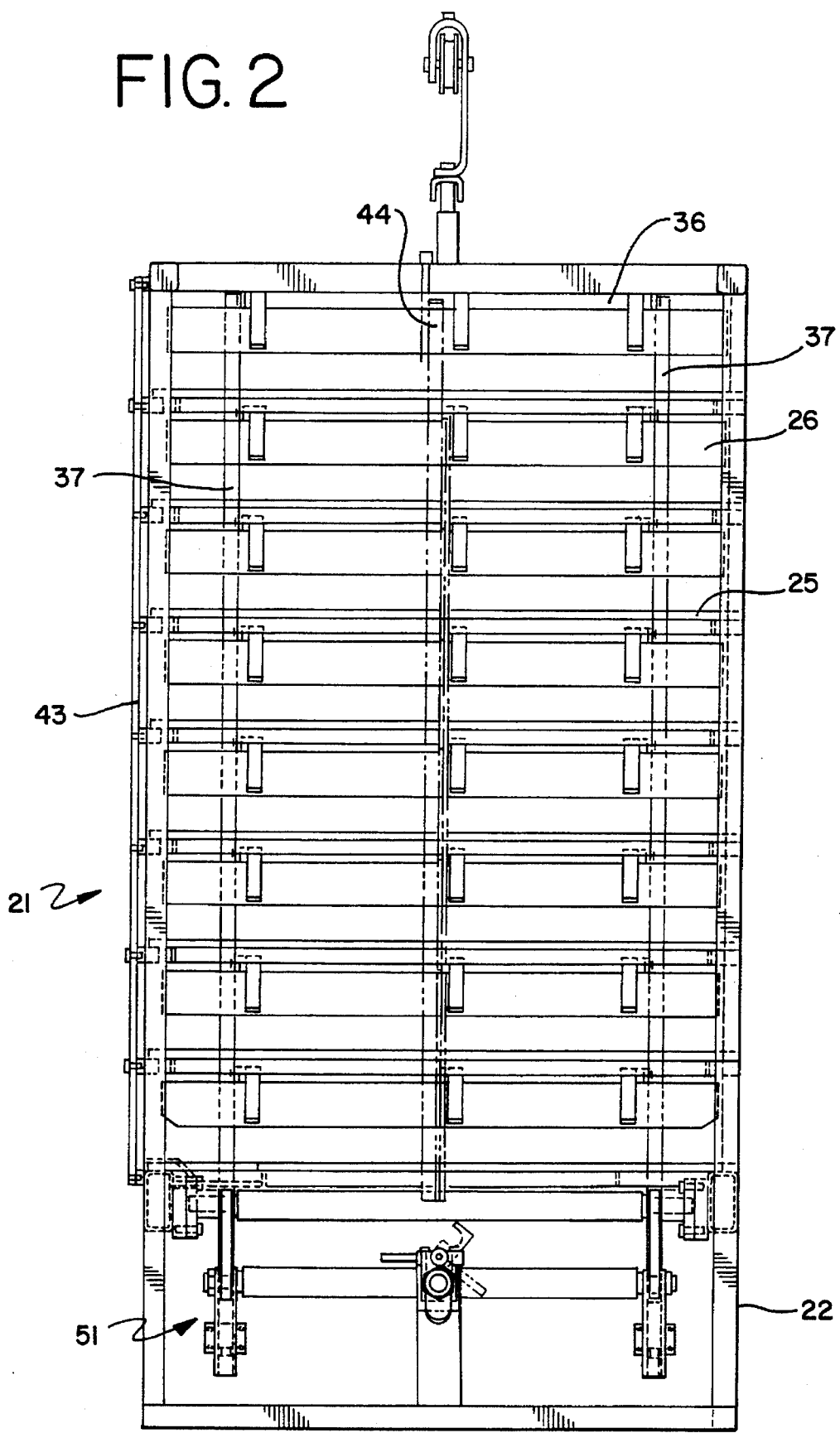
FIG. 2 is an end elevational view of the apparatus illustrated in FIG. 1.
Figure 6:
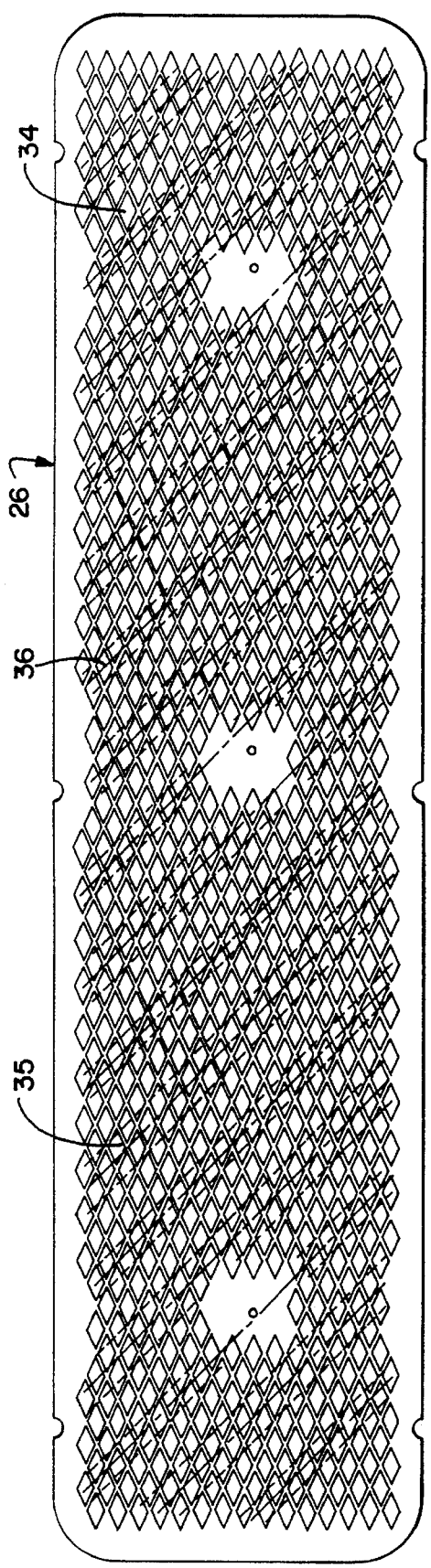
FIG. 6 is a top, plan view of an elongated forming and shaping plate suitable for use in connection with this apparatus.
Figure 7:
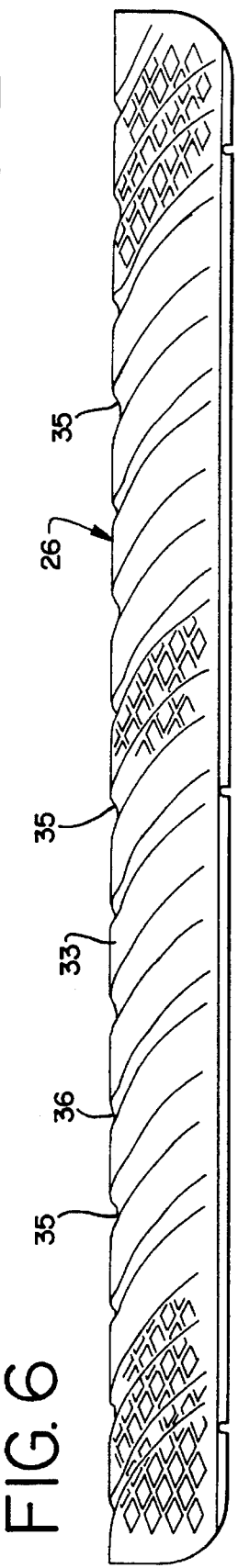
FIG. 7 is a side elevational view of the elongated plate illustrated in FIG. 6.

A preferred rack apparatus is generally illustrated in FIG. 1 and in FIG. 2 at reference numeral 21. Included is a frame assembly 22 having generally horizontal frame components and vertical frame components. A plurality of compartments 23 are generally defined thereby. In the illustrated embodiment, the rack apparatus is suspendable by means of a trolley assembly 24 in accordance with a trolley arrangement of a type that is generally known in the art. Such a trolley arrangement allows the rack assembly and food products contained therewithin to be moved from one treatment location or station to another treatment location or station in order to facilitate sequential treatment of the food loaves. Such treatments can include cooking by which the food is set, smoking by which the food is flavored and subjected to certain setting conditions, as well as other possible treatments with liquids and/or gases to impart desired properties to the finished loaf product.

One or more of the compartments 23 have opposing elongated plates that are arranged in pairs, at least one of the elongated plates being movable relative to the other elongated plate. These plate pairs have cross-sectional shapes which are useful in emulating natural sliced muscle meat shapes when the plate pairs compress the food loafs, sticks or cylinders therebetween.

In the illustrated embodiments, each elongated plate pair takes on the arrangement of an elongated bottom plate 25 and an elongated top plate 26. The configuration of the preferred illustrated bottom plates 25 is shown in greater detail in FIG. 11, while the preferred configuration of the top elongated plates is shown in greater detail in FIGS. 6, 7, 8, 9 and 10.

Figure 11:
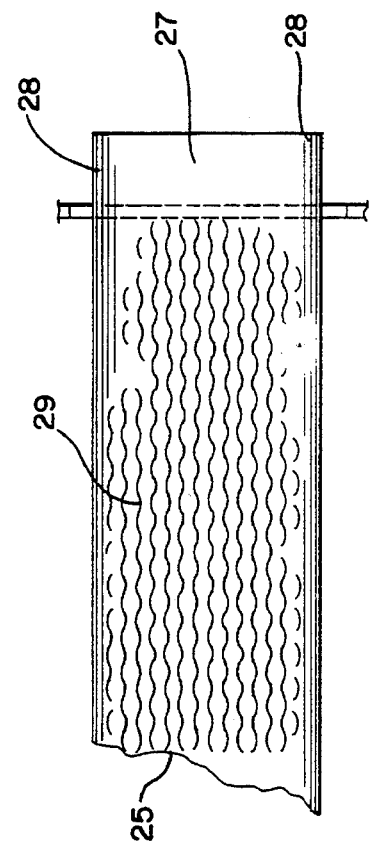
FIG. 11 is a plan view, partially broken away, of another elongated plate useful in the illustrated racking apparatus.
Figure 8:
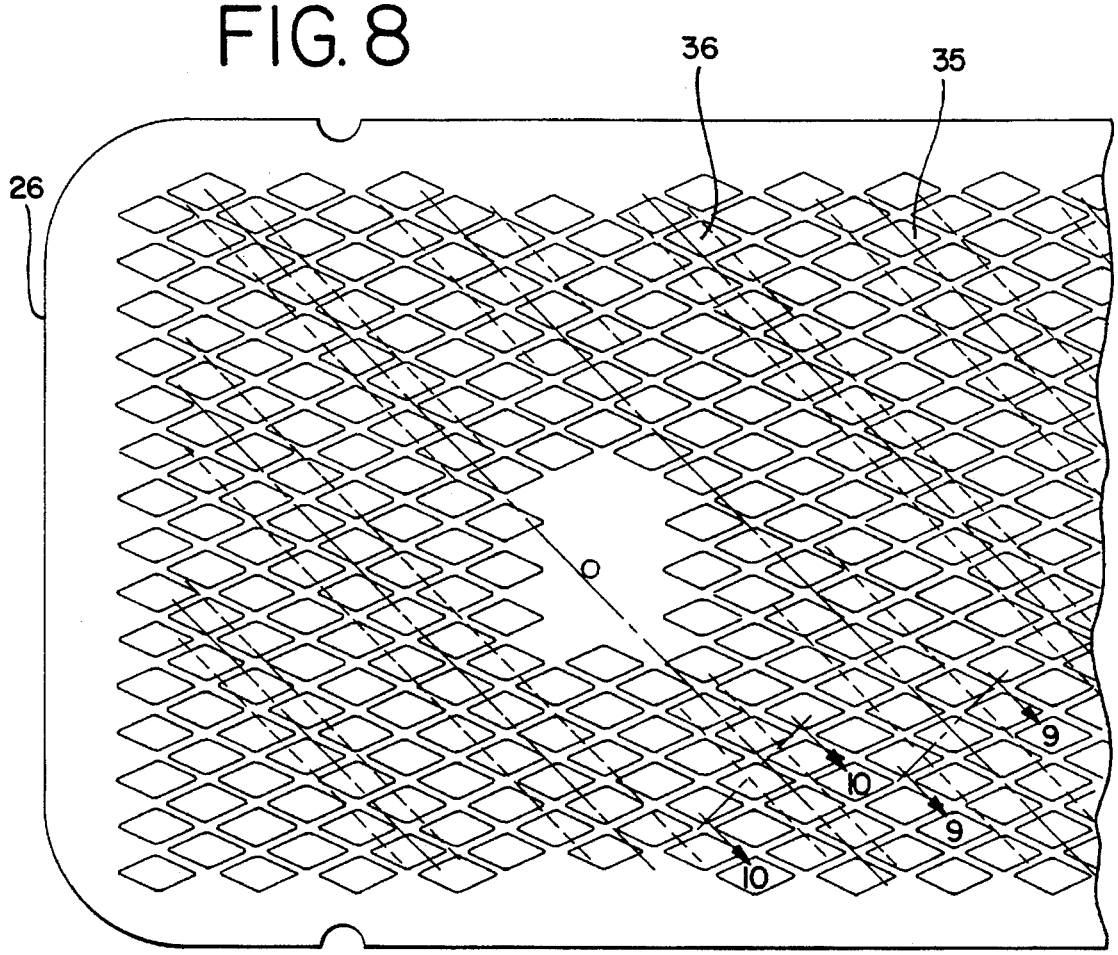
FIG. 8 is an enlarged detail view of a portion of the plate shown in FIG. 6.
Figure 9:
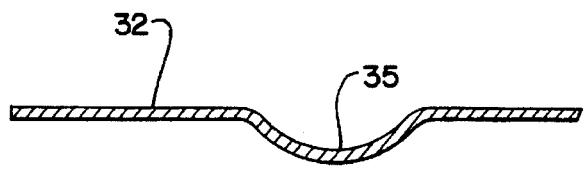
FIG. 9 is a cross-sectional view along the line 9—9 of FIG. 8.
Figure 10:
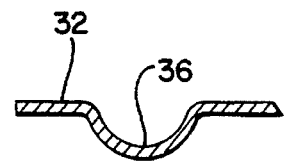
FIG. 10 is a cross-sectional view along the line 10—10 of FIG. 8.

As can be seen in FIGS. 1 and 11, the preferred elongated bottom plate 25 is shaped in the nature of a shallow trough having a generally flat main body portion 27 and generally upwardly bent longitudinal edges 28. Elongated plates 25 also include a plurality of indents. Illustrated indents in this regard define a grate network 29. The indents help to impart a desired texture to the food which it contacts under compression conditions and during cooking, smoking and the like. Preferably, the indents are openings defined between rigid lands, the illustrated indents giving a substantially diamond-shaped appearance.

The illustrated preferred elongated top plates 26 are preferably deeper than the bottom plates 25. In cross-section, the top plates 26 are generally curved, but preferably not symmetrically curved. Instead, the curve is more gradual along one side than along the other side, as can be noted particularly in FIG. 1. This somewhat approximates an overall shape of whole muscle carcass components, such as of a turkey, a ham or the like. A relatively shallow curved section 31 joins with a relatively steep curved section 32 along an elongated backbone area 33. A plurality of indents are included in order to define a lattice network 34 which is preferably provided throughout a large portion of the surface area of the elongated top plate 26. During operation of the rack apparatus, this lattice network combines with the compression afforded by the apparatus in order to impart a desired surface texture to the food product being subjected to treatment within the rack apparatus. Preferably, these indents are openings defined between rigid lands as shown and are generally diamond-shaped.

In the preferred embodiment, the indents of the elongated plates 26 further include a plurality of diagonally oriented valleys 35, 36. In the illustrated embodiment, valleys 35 are broader than valleys 36. This variation in valley depth and/or breadth further assists in imparting a naturally uneven appearance to the overall shape of the food product being prepared in the rack apparatus. The illustrated lattice network can be formed as stamping diamonds into which the valleys are bent, as is generally illustrated in the drawings.

With further reference to the indents, especially in the top elongated plates, a primary purpose of the geometry of these indents is to provide a uniform cross-sectional area for each slice prepared from the loaf. This geometry gives a random slice profile appearance while simultaneously contributing to weight control maintenance for a given slice thickness.

Relative movement between the elongated plates 25 and 26 is an important aspect of the invention. When moved to the closed orientation, the elongated plates engage each other to define the forming cavity. In the illustrated embodiment, each such plate is securely mounted either to a component of the frame or to a movable member in order to open and close the elongated cavity.

Horizontal plates 36 are secured to pusher assemblies 37 by suitable means such as the illustrated screws 38. Four such pusher assemblies 37 are illustrated. Each elongated top plate 26 is secured to its respective horizontal plate 36 by means of bracket and screw assemblies 39 which, in the illustrated embodiment, engage and support pairs of longitudinally disposed elongated top plates 26. These elongated top plates are secured along their other respective edges by suitable bracket arrangements 41, 42. A support bar 43 and a tension beam and strut assembly 44 are also included to provide vertically directed support for the rack apparatus.

In the illustrated embodiment, the elongated bottom plates 25 are mounted in a stationary manner, and downward displacement of the pusher assemblies 37 moves the elongated top plates 26 downwardly toward the respective elongated bottom plates 25 in order to thereby compress the food loaf, stick, chub or cylinder that is positioned therebetween. It is to be appreciated that other arrangements are possible, provided this compression movement is accomplished. For example, the elongated top plates could remain stationary while the elongated bottom plates move upwardly, or both the elongated bottom plates and top plates could move in opposite directions toward each other in order to close the cavity.

Movement of the pusher assemblies 37 and thus of the elongated top plates 26 is effected in the illustrated preferred embodiment by operation of drive linkage assemblies, generally designated as 51. Drive links 52, 53 are pivotally mounted to move between the generally opened orientation shown in FIG. 1 and FIG. 3 and the generally closed orientation which is generally shown in phantom in FIG. 1 and FIG. 3. When thus operated, the drive linkage assemblies 51 move the pusher assemblies 37 downwardly to effect the desired compression of the elongated food loaves positioned within the rack apparatus. It will be appreciated that, because the rack apparatus 21 typically will be suspended by way of the trolley assembly 24, the pusher assemblies 37 can extend below the bottom of the frame assembly 22 to the extent required in order to properly compress the particular food components that are operated upon by the rack apparatus.

Further details of the operation of the drive linkage assemblies 51 of the illustrated embodiment are found in FIG. 3 and FIG. 4. Bottom drive links 52 are pivotally secured by way of pins 54 to a bottom portion of its respective pusher assembly 37. The other end of each bottom drive link 52 is pivotally secured to a block 55, which also pivotally supports one end of each respective top drive link 53. The other end of each respective top drive link 53 is pivotally secured to a pivot bracket which is rigidly secured to the frame assembly 22.

During operation of the rack apparatus in order to move to its compression mode, the blocks 55 are moved substantially toward each other by a suitable mechanism. The illustrated mechanism includes a drive tube 57 having thrust bearings 58 generally centrally disposed therealong in conjunction with clamp collars 59. Rigidity is enhanced by a brace 61. A pivot tube 62 can also be provided in association with the pivot brackets 56. A threaded nut 63 and stop nut 64 assembly and associated screw drive arrangements operate, in conjunction with rotation of the drive tube assembly, to move the blocks 55 inwardly and outwardly as desired. When there is a need to generally lock the drive linkage assemblies into place, a handle 65 secures the clamp collars 59 to help to thereby prevent undesired movement of the linkage assemblies. Also provided are a block with screw 66 and a ham stop 67.

Slide bearing assemblies 71 are preferably included in order to facilitate movement of the pusher assemblies 37. Each pusher assembly is mounted within a slide bearing 72 in order to better insure that the pusher assemblies 37 remain in vertical alignment during operation of the rack apparatus. A bearing support 73 is secured to the frame 22.

In operation, a large generally cylindrical loaf, stick or chub of meat or other food, preferably within a suitable casing, is positioned between any or all of the top and bottom elongated plates. Typically, the large elongated food cylinder 74 will be positioned so as to rest upon an elongated bottom plate 25. The drive linkage assemblies 51 are activated in order to compress the elongated cylinder 74. Upon compression, the food cylinder is re-shaped to conform to the shape of the cavity defined between each elongated top plate and bottom plate. At the same time, the food is forced into the voids within the grate network 29 and the lattice network 34 in order to thereby provide a distinct and relatively deep surface texture to the outside surface of the food loaf, stick or chub. At the same time, the diagonally oriented valleys 35 add an additional irregular shape component to the food product being prepared. Because these valleys are generally diagonally oriented, the finished sliced food product will be provided with an irregular shape which is different from slice-to-slice, this being more commensurate with the appearance of slices from whole muscle meat sources. Accordingly, it will be appreciated that the present invention provides a non-uniform molded product which more closely approximates food products that originate directly from a naturally occurring source. Thereafter, the trolley assembly 24 facilitates movement of the rack apparatus to cooking stations and smoking stations in a manner that is generally well-known in the art. After chilling any casing is removed, and the non-uniformly molded loaf, stick or chub is ready for slicing.

It will be understood that the embodiments of the present invention which have been described are illustrative of some of the applications of the principles of the present invention. Various modifications may be made by those skilled in the art without departing from the true spirit and scope of the invention.

We claim:

1. A rack apparatus for forming food cylinders into food loaves having a shape which, when sliced, emulates food product slices from naturally occurring food sources such as whole muscle meat sources, the rack apparatus comprising:

a frame assembly generally defining at least one elongated compartment;

an elongated bottom plate within said compartment;

an elongated top plate within said compartment and generally oppositely disposed with respect to said elongated bottom plate;

at least one of said elongated plates has a plurality of indents defining a latticed inside surface;

said elongated bottom plate and elongated top plate combine to define a loaf-forming cavity which receives a food cylinder at a time when said cavity has a selected initial height of separation between said elongated bottom plate and said elongated top plate; and a moving assembly for controllably moving one or more of said elongated plates with respect to each other while the food cylinder is within said loaf-forming cavity until said selected initial height is reduced to a chosen compression height of said cavity.

2. The rack apparatus in accordance with claim 1, wherein said latticed inside surface includes at least one valley which is diagonally directed with respect to the elongated food cylinder, the valley forming reduced height areas along a food loaf that is compressed, formed and shaped from the food cylinder by the rack apparatus.

3. The rack apparatus in accordance with claim 1, wherein said plurality of indents are openings through the elongated plate such that, upon movement between the selected initial height and the chosen compression height, portions of the food loaf move into said openings.

4. The rack apparatus in accordance with claim 2, wherein said plurality of indents are openings through the elongated plate such that, upon movement between the selected initial height and the chosen compression height, portions of the food loaf move into said openings.

5. The rack apparatus in accordance with claim 1, wherein said elongated bottom plate has generally upwardly bent longitudinal edges and a plurality of indents which are openings to define a grate network, and wherein said longitudinal edges engage said elongated top plate when said loaf-forming cavity is at its chosen compression height.

6. The rack apparatus in accordance with claim 1, wherein said elongated top plate is curved in transverse cross-section, the curved cross-section being in at least two sections, one said section having a shallower curve profile than the other so as to define a non-symmetrical curved cross-section.

7. The rack apparatus in accordance with claim 1, wherein said elongated top plate is curved in transverse cross-section, the curved cross-section being in at least two sections, one said section having a shallower curve profile than the other so as to define a non-symmetrical curved cross-section, and said elongated bottom plate has generally upwardly bent longitudinal edges which engage respective said curved sections of the elongated upper plate.

8. The rack apparatus in accordance with claim 1, wherein both of said elongated bottom and top plates include a plurality of said indents, said indents being openings through each elongated plate, and said latticed inside surface of said elongated top plate includes at least one valley which is diagonally directed with respect to the elongated food cylinder, the valley forming reduced height areas along a food loaf that is compressed, formed and shaped from the food cylinder by the rack apparatus.

9. The rack apparatus in accordance with claim 2, wherein a plurality of said valleys are provided, one such valley being deeper than another such valley.

10. The rack apparatus in accordance with claim 1, wherein the moving assembly moves said elongated top plate, and said elongated bottom plate is stationary.

11. The rack apparatus in accordance with claim 1, wherein a plurality of elongated bottom plates and of elongated top plates are provided, said top plates being secured to a pusher assembly that moves upon operation of the moving assembly in order to form a plurality of said loaf-forming cavities.

12. The rack apparatus in accordance with claim 11, wherein said moving assembly includes a drive linkage assembly which opens and closes in order to move said pusher assembly.

13. The rack apparatus in accordance with claim 12, wherein said moving assembly further includes a rotation assembly which has an extension that moves laterally with respect to the drive linkage assembly in order to open and close the drive linkage assembly.

14. A rack apparatus for forming food cylinders into food loaves having a shape which, when sliced, emulates food product slices from naturally occurring food sources such as whole muscle meat sources, the rack apparatus comprising:

a frame assembly generally defining at least one elongated compartment;

an elongated bottom plate within said compartment;

an elongated top plate within said compartment and generally oppositely disposed with respect to said elongated bottom plate;

at least one of said elongated plates has a plurality of indents that are openings defining a latticed inside surface which includes at least one valley which is diagonally directed with respect to the elongated food cylinder, the valley projecting inwardly toward the opposing elongated plate;

said elongated bottom plate and elongated top plate combine to define a loaf-forming cavity which receives a food cylinder at a time when said cavity has a selected initial height of separation between said elongated bottom plate and said elongated top plate; and a moving assembly for controllably moving one or more of said elongated plates with respect to each other while the food cylinder is within said loaf-forming cavity until said selected initial height is reduced to a chosen compression height of said cavity.

15. The rack apparatus in accordance with claim 14, wherein said elongated bottom plate has generally upwardly bent longitudinal edges and a plurality of indents which are openings to define a grate network, and wherein said longitudinal edges engage said elongated top plate when said loaf-forming cavity is at its chosen compression height.

16. The rack apparatus in accordance with claim 14, wherein said elongated top plate is curved in transverse cross-section, the curved cross-section being in at least two sections, one said section having a shallower curve profile than the other so as to define a non-symmetrical curved cross-section.

17. The rack apparatus in accordance with claim 16, wherein said elongated top plate is curved in transverse cross-section, the curved cross-section being in at least two sections, one said section having a shallower curve profile than the other so as to define a non-symmetrical curved cross-section, and said elongated bottom plate has generally upwardly bent longitudinal edges which engage respective said curved sections of the elongated upper plate.

18. The rack apparatus in accordance with claim 14, wherein a plurality of said valleys are provided, one such valley being deeper than another such valley.

19. The rack apparatus in accordance with claim 14, wherein the moving assembly moves said elongated top plate, and said elongated bottom plate is stationary;

a plurality of elongated bottom plates and of elongated top plates are provided, said top plates being secured to a pusher assembly that moves upon operation of the moving assembly in order to form a plurality of said loaf-forming cavities;

said moving assembly includes a drive linkage assembly which opens and closes in order to move said pusher assembly; and said moving assembly further includes a rotation assembly which has an extension that moves laterally with respect to the drive linkage assembly in order to open and close the drive linkage assembly.

* * * * *